United States Patent [19]

Hester, Jr.

[11] 3,856,809
[45] Dec. 24, 1974

[54] PROCESS FOR PREPARING 2,4-DIHYDRO-6-PHENYL-1H-S-TRIAZOLO[4,3-a][1,4]BENZODIAZEPIN-1-ONE COMPOUNDS

[75] Inventor: Jackson B. Hester, Jr., Gelesburg, Mich.

[73] Assignee: The Upjohn Company, Kalamazoo, Mich.

[22] Filed: Sept. 17, 1973

[21] Appl. No.: 397,966

[52] U.S. Cl........ 260/308 C, 260/239.3 D, 424/269
[51] Int. Cl............................................ C07d 57/02
[58] Field of Search ............................... 260/308 C

[56] References Cited
OTHER PUBLICATIONS

Elderfield, Heterocyclic Compounds, Vol. 7, (New York, 1961), p. 453, QD400E4.

Primary Examiner—Alton D. Rollins

[57] ABSTRACT

A process for the production of 2,4-dihydro-6-phenyl-1H-s-triazolo[4,3-a][1,4]benzodiazepin-1-ones by treating a 1-halo-6-phenyl-4H-s-triazolo[4,3-a][1,4]benzodiazepine of the formula

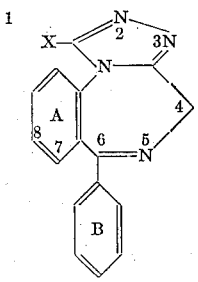

wherein X is chlorine or bromine; wherein the A ring is substituted in position 8 with hydrogen, chlorine, or bromine and wherein the B ring is substituted in one or both ortho positions with hydrogen, chlorine, or fluorine, with phosphoric acid in high concentration.

4 Claims, No Drawings

PROCESS FOR PREPARING 2,4-DIHYDRO-6-PHENYL-1H-S-TRIAZOLO[4,3-a][1,4]BENZODIAZEPIN-1-ONE COMPOUNDS

BACKGROUND OF THE INVENTION

FIELD OF THE INVENTION

This invention is directed to a new chemical process and in particular to a process to prepare 2,4-dihydro-6-phenyl-1H-s-triazolo[4,3-a][1,4]benzodiazepin-1-ones.

The novel process and the compounds produced thereby can be illustratively represented by the following formulae:

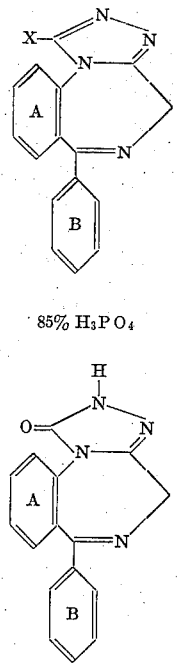

wherein X is chlorine or bromine; wherein the A ring is substituted in position 8 with hydrogen, chlorine, or bromine and wherein the B ring is substituted in the ortho positions with hydrogen, chlorine, or fluorine. Compound 11 can be further alkylated, in position 2, by conventional methods as shown in U.S. Pat. Nos. 3,646,055 and 3,708,592. The resulting products have the formula

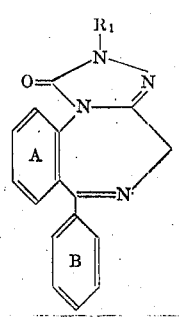

wherein $R_1$ is alkyl of 1 to 3 carbon atoms, inclusive, and the A and B rings are defined as above.

The alkyl group therefore can be methyl, ethyl, propyl, and isopropyl. The most important substituents in formulae II and III are chlorine in the 8 and ortho-position.

In carrying out the novel process a selected 1-bromo or 1-chloro-6-phenyl-4H-s-triazolo[4,3-a][1,4]benzodiazepine 1, with the 1-bromo species preferred, is heated in excess of an aqueous mineral acid in the absence of any solvents. Hydrochloric acid, dilute sulfuric acid, and phosphoric acid, serve this purpose, with 85% phosphoric acid being preferred. The heating is carried out at a temperature between 100°–150° C. for a period of 1 to 10 hours. After this time the product II is isolated by conventional procedures, usually by extraction, after neutralization with an aqueous base e.g., aqueous sodium or potassium hydroxide or carbonate. The extraction is carried out with water-immiscible solvents such as benzene, ethyl acetate, methylene chloride, chloroform, Skellysolve B hexanes, mixtures thereof and the like. After evaporation of the solvent the crude product is purified by conventional procedures e.g., crystallization, chromatography and the like.

The starting compounds of formula I of this reaction and the method of preparation is described in detail in U.S. Pat. No. 3,573,324 and in Preparations 1 through 3.

The final compounds (II) of this reaction e.g, 2,4-dihydro-6-phenyl-s-triazolo[4,3-a][1,4]benzodiazepin-1-ones, have sedative, tranquilizing and anxiolytic effects. For example sedative effects for 8-chloro-2,4-dihydro-6-phenyl-1H-s-triazolo[4,3-a][1,4]benzodiazepin-1-one are shown by the following tests in mice:

Chimney test: Med. Exp. 4, 145 (1961)]: The effective intraperitoneal dosage for 50% of mice ($ED_{50}$) is 3.5 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dost of test compound at which 50% of the mice remain in the dish. The $Ed_{50}$ (intraperitoneal administration) in this test is 1 mg./kg.

Pedestal test: The untreated mouse leaves the pedestal in less than a minute to climb back to the floor of the standard mouse box. Tranquilized mice will stay on the pedestal for more than one minute. The $ED_{50}$ (intraperitoneal administration) is 3.5 mg/kg.

Nicotine antagonism test: Mice in a group of 6 are injected with the test compound. Thirty minutes later the mice including control (untreated) mice are injected with nicotine salicylate (2 mg./kg.). The control mice show overstimulation, i.e., (1) running convulsions followed by (2) topic extensor fits, followed by (3) death. An intraperitoneal dosage of 1.6 mg./kg. of the test compound protected 50% of the mice against (3).

The compounds of formula II can be used for tranquilization of mammals in pharmaceutical formulations and dosage forms as described in detail in U.S. Pat. Nos. 3,708,592 and 3,646,055.

The following Examples and Preparations are illustrative of the process of the present invention, but are not to be construed as limiting.

PREPARATION 1

1,8-Dichloro-6-phenyl-4H-s-triazolo[4,3-a][1,4]-benzodiazepine.

A stirred mixture of 8-chloro-6-phenyl-4H-s-triazolo[4,3-a][1,4]benzodiazepine (2.95 g., 0.01 mole), N-chloro-succinimide (1.48 g., 0.011 mole) and carbon tetrachloride (200 ml.) was refluxed under a nitrogen atmosphere for 7 hours and kept at ambient temperature for 16 hours. Water and enough chloroform to dissolve the precipitated produce were added to the mixture and the layers were separated. The aqueous layer was extracted with chlorofrom and the combined organic solution was dried over anhydrous potassium carbonate and concentrated. The residue was chromatographed on silica gel (200 g.) with 1% methanol-99% chloroform. The product obtained from the column was crystallized from ethyl acetate to give: 1,8-dichloro-6-phenyl-4H-s-triazolo[4,3-a][1,4]benzodiazepine 0.57 g., of melting point 198°–199° C. and 0.19 g. of melting point 197.5°–198.5° C. The analytical sample had a melting point of 198°–199° C.

Anal. calcd. for $C_{16}H_{10}Cl_2N_4$:

C, 58.38; H, 3.06; Cl, 21.54; N, 17.02.
Found:
C, 58.72; H, 3.09; Cl, 21.70; N, 16.93.

PREPARATION 2

1-Bromo-8-chloro-6-phenyl-4H-s-triazolo-[4,3-a][1,4]benzodiazepine

A stirred mixture of 8-chloro-6-phenyl-4H-s-trizolo-[4,3-a][1,4]benzodiazepine (14.7 g., 0.05 mole), N-bromosuccinimide (8.9 g., 0.05 mole), and carbon tetrachloride (1 liter) was refluxed, under a nitrogen atmosphere for 4 hours, cooled and concentrated in vacuo. The residue was mixed with water and extracted with chloroform. The extract was dried over anhydrous potassium carbonate and concentrated. Crystallization of the residue from ethyl acetate gave 7.74 g. of 1-bromo-8-chloro-6-phenyl-4H-s-triazolo[4,3-a][1,4]benzodiazepine of melting point 202.5°–206° C. The mother liquor was concentrated and chromatographed on silica gel (500 g.) with 2.5% methanol-97.5% chloroform. The product obtained from the column was recrystallized from ethyl acetate to give 3.01 g. of 1-bromo-8-chloro-6-phenyl-4H-s-triazolo[4,3-a][1,4]benzodiazepine of melting point 205°–207°. The analytical sample had a melting point of 202°–203.5° C.

Anal. calcd. for $C_{16}H_{10}BrClN_4$:

C, 51.43; H, 2.70; Br, 21.39; Cl, 9.49; N, 15.00.
Found:
C, 51.32; H, 2.98; Br, 21.14; Cl, 9.59; N, 15.20.

PREPARATION 3

1,8-Dibromo-6-(o-chlorophenyl)-4H-s-triazolo-[4,3-a][1,4]benzodiazepine

A. 7-Bromo-5-(o-chlorophenyl)-1,3-dihydro-2H-1,4-benzodiazepine-2-thione was refluxed in ethanol with formic acid hydrazide to give 8-bromo-6-(o-chlorophenyl)-4H-s-triazolo[4,3-a][1,4]benzodiazepine.

B. 1,8-Dibromo-6-(o-chlorophenyl)-4H-s-triazolo[4,3-a]-[1,4]benzodiazepine.

In the manner given in Preparation 2, 8-bromo-6-(o-chlorophenyl)-4H-s-triazolo[4,3-a][1,4]benzodiazepine was allowed to react with N-bormosuccinimide in carbon tetrachloride to give 1,8-dibromo-6-(o-chlorophenyl)-4H-s-triazolo[4,3-a][1,4]benzodiazepine.

EXAMPLE 1

8-Chloro-2,4-dihydro-6-phenyl-1H-s-triazolo[4,3-a]-[1,4]benzodiazepin-1-one

To 30 ml. of 85% phosphoric acid, at room temperature, in a nitrogen atmosphere is added 1 g. (0.00268 mole) of 1-bromo-8-chloro-6-phenyl-4H-s-triazolo[4,3-a][1,4]benzodiazepine. This mixture is heated to 118°–121° C. and kept at this temperature for 5 hours. The mixture is then cooled and poured into about 500 ml. of ice and water. To this cold aqueous reaction mixture is added a sufficient amount of 50% aqueous sodium hydroxide to make it alkaline. The alkaline mixture is then extracted four times with 100 ml. portions or chloroform; the chloroform extracts are combined, dried over anhydrous sodium sulfate, and concentrated in vacuo. The resulting residue is crystallized from methylene chloride-ethanol to give 0.671 g. of 8-chloro-2,4-dihydro-6-phenyl-1H-s-triazolo-[4,3-a][1,4]benzodiazepin-1-one of melting point 255.5°–257.5°.

EXAMPLE 2

8-Chloro-2,4-dihydro-6-(o-chlorophenyl)-1H-s-triazolo[4,3-a][1,4]benzodiazepin-1-one In the manner given in Example 1, 1,8-dichloro-6-(o-chlorophenyl)-4H-s-triazolo[4,3-a][1,4]benzodiazepine was heated to 120° C. with 60% aqueous sulfuric acid for 6 hours to give 8-chloro-2,4-dihydro-6-(o-chlorophenyl)-1H-s-triazolo[4,3-a][1,4]benzodiazepin-1-one.

EXAMPLE 3

8-Chloro-2,4-dihydro-6-(o-fluorophenyl)-1H-s-triazolo[4,3-a][1,4]benzodiazepin-1-one In the manner given in Example 1, 1,8-dichloro-6-(o-fluorophenyl)-4H-s-triazolo[4,3-a][1,4]benzodiazepine was heated with 85% phosphoric acid to give 8-chloro-2,4-dihydro-6-(o-fluorophenyl)-1H-s-triazolo[4,3-1][1,4]-benzodiazepin-1-one.

EXAMPLE 4

8-Chloro-2,4-dihydro-6-phenyl-1H-s-triazolo-[4,3-a][1,4]benzodiazepin-1-one

In the manner given in Example 1, 1,8-dichloro-6-phenyl-4H-s-triazolo[4,3-a][1,4]benzodiazepine was heated to 120° C. with concentrated hydrochloric acid for 6 hours to give 8-chloro-2,4-dihydro-6-phenyl-1H-s-triazolo[4,3-a]-[1,4]benzodiazepin-1-one.

EXAMPLE 5

8-Chloro-2,4-dihydro-6-(2,6-difluorophenyl)-1H-s-triazolo-[4,3-a][1,4]benzodiazepin-1-one In the manner given in Example 1 1-bromo-8-chloro-6-(2,6-difluorophenyl)-4H-2-triazolo[4,3-a][1,4]benzodiazepine was heated with 85% phosphoric acid to give 8-chloro-2,4-dihydro-6-(2,6-difluorophenyl)-1H-s-triazolo[4,3-a][1,4]-benzodiazepin-1-one.

EXAMPLE 6

8-Chloro-2,4-dihydro-6-(o-chlorophenyl)-1H-s-triazolo[4,3-a][1,4]benzodiazepin-1-one In the manner given in Example 1, 1-bromo-8-chloro-6-(o-chlorophenyl)-4H-s-triazolo[4,3-a][1,4]benzodiazepine is heated to 120° C. with 85% phosphoric acid for 6 hours to give 8-chloro-2,4-dihydro-6-(o-chlorophenyl)-1H-s-triazolo-[4,3-a][1,4]benzodiazepin-1-one.

EXAMPLE 7

8-Bromo-6-(o-chlorophenyl)-2,4-dihydro-1H-s-triazolo[4,3-a][1,4]benzodiazepin-1-one In the manner given in Example 1, 1,8-dibromo-6-(o-chlorophenyl)-4H-s-triazolo[4,3-a][1,4]benzodiazepine is heated with 85% phosphoric acid to give 8-bromo-6-(o-chlorophenyl)-1H-s-triazolo[4,3-a][1,4]benzodiazepin-1-one.

In the manner given in the preceeding example other 6-phenyl-2,4-dihydro-1H-s-triazolo[4,3-a][1,4]benzodiazepin-1-ones of formula II can be produced. Representative other compounds thus obtained include:

2,4-dihydro-6-(o-chlorophenyl)-1H-s-triazolo[4,3-a][1,4]-benzodiazepin-1-one;
7-chloro-2,4-dihydro-6-(o-fluorophenyl)-1H-s-triazolo-[4,3-a][1,4]benzodiazepin-1-one;
9-bromo-2,4-dihydro-6-(o-chlorophenyl)-1H-s-triazolo-[4,3-a][1,4]benzodiazepin-1-one;
10-chloro-2,4-dihydro-6-(2,6-difluorophenyl)-1H-s-triazolo-[4,3-a][1,4]benzodiazepin-1-one;
10-bromo-2,4-dihydro-6-(2,6-dichlorophenyl)-1H-s-triazolo[4,3-a][1,4]benzodiazepin-1-one;
9-chloro-2,4-dihydro-6-(o-fluorophenyl)-1H-s-triazolo-[4,3-a][1,4]benzodiazepin-1-one;
7-bromo-2,4-dihydro-6-phenyl-1H-s-triazolo[4,3-a][1,4]-benzodiazepin-1-one;
7-bromo-2,4-dihydro-6-(o-chlorophenyl)-1H-s-triazolo-[4,3-a][1,4]benzodiazepin-1-one; and the like.

These compounds II can be alkylated by a process as shown below.

PREPARATION 4

2,4-Dihydro-8-chloro-2-methyl-6-(o-chlorophenyl]-1H-s-triazolo[4,3-a][1,4]benzodiazepin-1-one and its hydrochloride A solution of 1.0 g. of 2,4-dihydro-6-(o-chlorophenyl)-1H-s-triazolo[4,3-a][1,4]benzodiazepin-1-one in 25 ml. of dry dimethylformamide in a nitrogen atmosphere is treated with 0.145 g. of sodium hydride (a 58% suspension of NaH in mineral oil). This mixture is heated on the steam bath for 15 minutes resulting in a solution. This solution is cooled in an ice bath and thereto is added 0.5 g. of methyl iodide in about 5 ml. of ether. After stirring the reaction mixture for 18 hours at about 22°–24° C., the mixture is concentrated and the resulting residue chromatographed over 100 g. of silica gel with an ethyl acetate-cyclohexane (in 1:1 by volume ratio) solution. The product is crystallized from ether-Skelly B to give 2,4-dihydro-8-chloro-2-methyl-6-(o-chlorophenyl)-1H-s-triazolo[4,3-a][1,4]benzodiazepin-1-one having a melting point of 82°–84° C. The latter is converted with ethereal hydrogen chloride to its hydrochloride salt.

I claim:

1. A process for the production of a 2,4-dihydro-6-phenyl-1H-s-triazolo[4,3-a][1,4]benzodiazepin-1-one of the formula II:

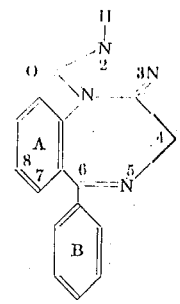

II wherein the A-ring is substituted in position 8 with hydrogen, chlorine or bromine; and wherein the B-ring is substituted in the ortho positions with hydrogen, chlorine, or fluorine, which comprises: Heating between 100°–150° a compound of formula I

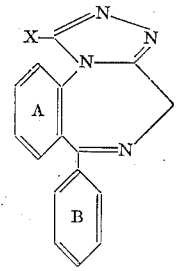

I wherein X is chlorine or bromine and rings A and B are defined as above, with an aqueous mineral acid for 1 to 10 hours, to obtain the compound of formula II above.

2. The process of claim 1 wherein the aqueous mineral acid is 85% phosphoric acid.

3. The process of claim 1 wherein the starting compound I has the formula

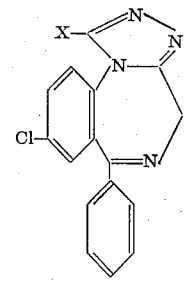

wherein X is bromine or chlorine.

4. The process of claim 1 wherein the starting compound I has the formula

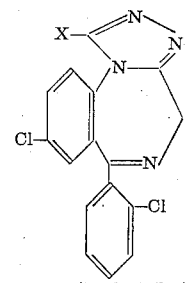

wherein X is chlorine or bromine.

* * * * *

UNITED STATES PATENT OFFICE
CERTIFICATE OF CORRECTION

Patent No. 3,856,809  Dated December 24, 1974

Inventor(s) Jackson B. Hester, Jr.

It is certified that error appears in the above-identified patent and that said Letters Patent are hereby corrected as shown below:

Face Page, Title "1H-S-" should read -- 1H-s- --.
Column 1, title "1H-S-" should read -- 1H-s- --.
Column 2, line 42 "dost of" should read -- dose of --.
Column 2, line 44 "Ed$_{50}$" should read -- ED$_{50}$ --.
Column 2, line 56 "topic extensor" should read -- tonic extensor --.
Column 6, Claim 1, Figure II " 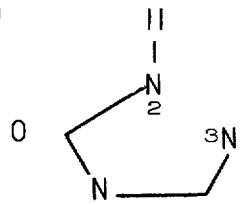 " should read -- 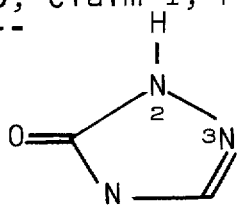 --.

Signed and Sealed this

*Twenty-first* Day of *March 1978*

[SEAL]

Attest:

RUTH C. MASON
*Attesting Officer*

LUTRELLE F. PARKER
*Acting Commissioner of Patents and Trademarks*